April 28, 1964     J. J. MAUGET     3,130,519
DEVICE FOR INJECTION FEEDING OF PLANTS
Filed Aug. 14, 1961
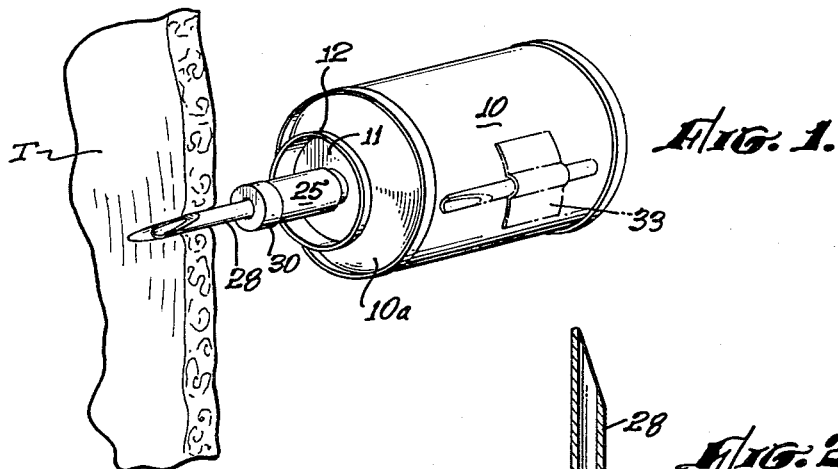
FIG. 1.
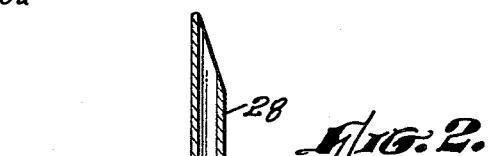
FIG. 2.
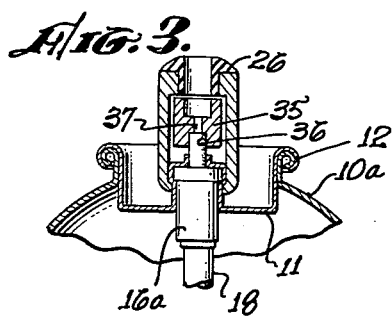
FIG. 3.
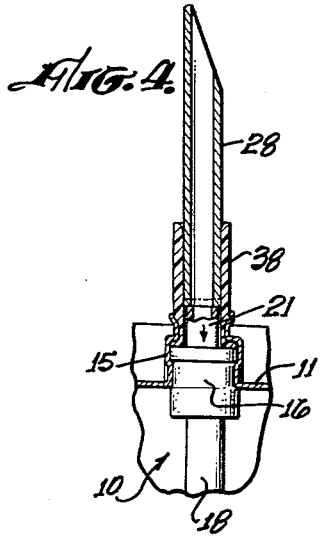
FIG. 4.
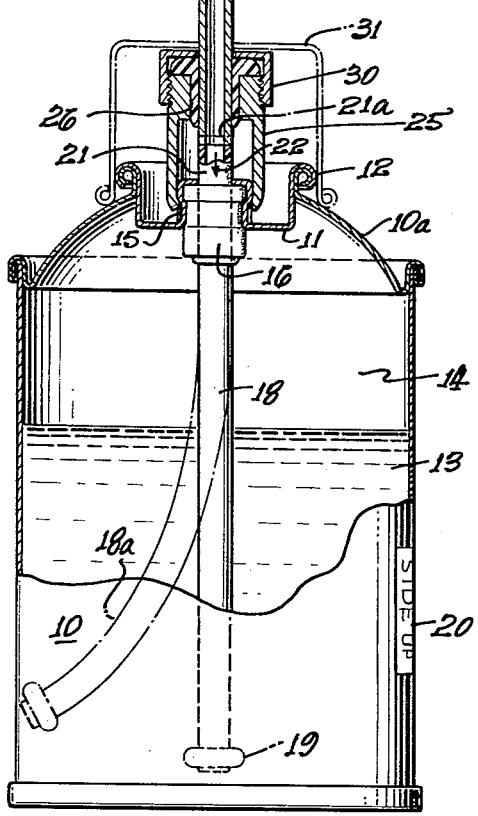
JAMES J. MAUGET,
INVENTOR.
By Knight + Rodgers
ATTORNEYS.

United States Patent Office 3,130,519
Patented Apr. 28, 1964

3,130,519
DEVICE FOR INJECTION FEEDING OF PLANTS
James J. Mauget, San Gabriel, Calif., assignor to J. J. Mauget Co., Inc., Los Angeles, Calif., a corporation of California
Filed Aug. 14, 1961, Ser. No. 131,290
8 Claims. (Cl. 47—57.5)

The present invention relates to apparatus for injecting plants with solutions of various types; and more especially to means for packaging and injecting solutions, under pressure, so as to render safe the use and handling of toxic materials in treating plants by injection methods. The plants most commonly treated by this injection method are trees because they have a large stem or trunk; but, generally speaking, any shrub or bush or other plant with a main stem of a size sufficient to receive the feeding tube, can be treated by injection means and methods.

Injection of plants is carried out by inserting a feeder tube into the stem of the plant deeply enough that the open inner end of the tube is beneath the cortex layer of the trunk. The equipment may be compared with a hypodermic needle used on humans; and the injection method is similar to intravenous feeding since the result is the injection of the desired solution directly into the sap stream of the plant.

Injection treatment of plants, while not new, is not widely known and understood; but the potential results of such treatment are great. One area of use of injection methods is to feed nutrient solutions to plants in order to remedy deficiencies in nutrients naturally available to the plant. This method of treating plants has been used with highly beneficial results to administer micro-quantities of necessary nutrients, particularly metals and their compounds.

In addition to the administration of nutritional solutions, injection methods generally referred to as chemotherapy, may be used to administer selected solutions for growth control, prevention of disease, and elimination of insects. Insects as well as virus and fungus infections can now be controlled in many situations by the use of various antibiotics and by systemic insecticides. Research has shown that insecticides now available are very effective in controlling, combating and eliminating various insect pests and thereby the spread of many diseases. The diseases themselves, for example the Dutch elm disease that so rapidly destroys beautiful and valuable shade trees, can in many cases be controlled by administering antibiotics. Problems arise in the handling and application by injection of solutions to trees and other plants. Such solutions have in the past been administered by gravity type reservoirs attached to feeder tubes inserted in the plant stems. While these feeders have been satisfactory for many applications, they have certain definite limitations. In general they only have a small capacity for the solution to be administered; the solution is administered at a low rate; and such gravity feeders are not hermetically sealed and therefore are not suitable for the handling of modern systemic insecticides which are toxic, although they are suitable for nutrient solutions and antibiotics that are non toxic to humans.

At the present time there are known and available for use various systemic insecticides of very superior and effective action that offer the utmost in plant protection. However these materials are of such high toxicity to humans and warm blooded animals that official regulations bar their use by the home gardener and make even their use by licensed persons cumbersome and expensive. This is because of the great hazard of being poisoned by inhalation of the fumes or by direct contact of the solutions themselves, hazards which are present with previously available means for applying the materials to plants. The same hazards are also involved in the general handling, transportation, and distribution of the toxic materials themselves, requiring care in handling and isolation of the materials to prevent contact with humans.

Thus it becomes a general object of my invention to provide a safer means of handling and injecting into plants liquid solutions of highly toxic materials and to make such toxic materials generally available to the public at large by eliminating the hazards involved in possible contact with such materials by the users or other people.

It is also an object of the present invention to provide improved feeder means for positively injecting solutions into plants to increase the capacity and feeding rate of such apparatus.

It is a further object of the invention to adapt known types of closed containers to cooperation with a plant feeding tube in order to utilize the advantages of such containers as shipping containers and also self-emptying reservoirs with solutions to be injected into plants.

These advantages of my invention have been achieved in an apparatus for injecting liquids directly into the stem of the plant, comprising a container having a quantity of liquid to be dispensed therefrom and provided with suitable liquid discharge means; means within the container placing the liquid under a pressure greater than atmospheric; valve means controlling flow of the liquid through the discharge means and movable by external pressure to an open position; a feeding tube communicating with the valve means at one end to receive liquid discharged at the valve and to transmit said liquid to the plant, the feeding tube being insertable at the other end into the stem of a plant to serve as a feeder tube for the plant; and means mounted on the container removably receiving the feeding tube and holding the tube in contact with the valve to hold the valve in open position.

How the above objects of my invention, as well as other objects not specifically referred to herein, are attained will be better understood by reference to the following description and to the annexed drawing, in which:

FIG. 1 is a perspective of a liquid injection device constructed according to my invention as it appears in use, the device being shown as attached to the trunk of a tree of which only a fragment is shown.

FIG. 2 is a vertical median section through the device removed from the tree and resting on its base, but with the feeding tube shown in fully operative position.

FIG. 3 is a fragmentary section corresponding to a portion of FIG. 2 showing a modified form of the invention.

FIG. 4 is a fragmentary section through a variational form of valve and means for holding the feeder tube in position with respect to the valve.

Referring now to the drawing, there is shown in FIG. 1 a fluid injection device embodying the present invention as it would appear in use with the feeding tube inserted in the stem or trunk T of the tree. It will be seen that the feeding device includes a pressurized container indicated generally at 10. While the container may be of any suitable design and may have any shape desired other than that shown, the container 10 illustrated is, by way of example, a commonly known pressurized container used for the distribution of various liquids in the form of aerosols which are sprayed directly from the container. Since pressurized containers of this type are well known and easily available, the liquid discharge means and the valve associated with the container have been modified as required to adapt them to the objects and purposes of the present invention.

A container of this type is shown in considerably greater detail in FIG. 2 wherein the container 10 is shown as being closed at its top by means of a recessed valve-mounting cup 11 which is secured to the domed top wall 10a at one end of the cylindrical container body by means of a rolled seam 12. The main body portion of container 10 holds a quantity of liquid 13 to be dispensed, the liquid being maintained under a pressure greater than atmospheric by means of a body of compressed gas 14 in the space above the liquid. The gas pressure on the free liquid surface may be established in any one of various ways well known in the art, as by inserting a small piece of solid carbon dioxide within the container at the time it is filled with the liquid, or by building up the pressure in any other suitable fashion.

The container may be made of metal or a suitable plastic inert with respect to the contents. A plastic that is translucent permits visual observation of the liquid level, which is advantageous.

Mounting cup 11 as illustrated is a form of cup well known in the art and which is adapted to close the opening in the domed wall 10a through which the contents of the can are inserted at the time of filling, the cup closing a central opening in the cover. Cup 11 is circular in outline when viewed in plan and has a central socket 15 which receives and retains suitable valve means 16 which controls the discharge of liquid of body 13 from the container.

The means for discharging liquid from the container includes dip tube 18 which extends downwardly from the body of valve 16 into the container to the bottom thereof. Tube 18 may be a rigid member; but is commonly a flexible member made of a synthetic resin or plastic which is inert with respect to the contents of the container and is preferably flexible. The lower end of tube 18 when flexible is provided with weight 19 which causes the lower end of the tube to seek the lowest portion of the can. Thus when the container is resting on its base with the discharge valve at the top as in FIG. 2, tube 18 extends directly downwardly from valve 16. On the other hand, when the container is turned on its side, as in FIG. 1, the weight 19 causes the discharge tube 18 to bend to the position indicated by the dotted lines 18a so that the open lower end of the tube is at the lowest portion of the can. In the event that tube 18a is not flexible but is rigid and curved, following the outline 18a, it then becomes desirable to orient the can with a given side up so that the open end of the tube is at or near the lowest side of the container. This can be done by providing a label 20 on the exterior surface of the container indicating that portion of the container which is to be uppermost when in position for injecting liquid into the tree trunk.

In addition to dip tube 18 and valve 16, the liquid discharge means associated with container 10 includes valve stem 21 which is hollow and projects upwardly from the body of valve 16 which is secured within socket 15 by a crimping or spinning operation. Valve stem 21 is hollow and is adapted to open the valve by being moved bodily toward the valve, that is downwardly in the direction of arrow 22 in FIG. 2. The valve is spring biased to a closed position, stem 21 normally being lifted by the spring to the level of dotted line 21a. When the valve 16 is open, liquid is forced by internal gas pressure in space 14 upwardly through tube 18 and outwardly of the container through the hollow stem 21. Interior portions of the valve are not shown in the drawing since they are well known and may be of any suitable design.

As so far described, the pressurized container and the liquid discharge means attached thereto are generally well known in the art of packaging liquids in pressurized containers and the details so far given are only those which are required to an understanding of the present invention. The particular type of container and valve illustrated are merely exemplary of those that may be used with the present invention and it will be realized that other designs and constructions of these elements may likewise be used. An example of suitable internal valve structures for valve 16 is found in Patent No. 2,961,131, issued November 22, 1960, to J. W. Bradbury.

The present invention, however, relates to a different area of use and application of the pressurized container and is concerned with a new combination of structural elements, as will be described, which is effective to perform a new function to meet the needs of the art of chemotherapeutic treatment of plants by injecting liquids directly into the stem or trunk of a plant. In order to adapt the known structure to the present invention, there is added to the structure so far described a protective sleeve or guard 25 which is mounted at its base on socket 15 of the cup 11. The protective sleeve may be a press fit over the socket, or the lower protion of the sleeve may be spun or crimped as illustrated in FIG. 2 in order to effect a firm, secure connection between the lower end of the sleeve and the socket on the cup. The connection is firm not only for structural reasons but to prevent leakage of gas or liquid at the base of the sleeve.

Protective sleeve 25 has a longitudinally extending bore which is open at the upper end of the sleeve and in which is mounted a resilient bushing 26 which may be made of rubber or any other suitable resilient material which preferably has a high coefficient of friction. Bushing 26 fits snugly within the bore of sleeve 25 and in turn has a central bore of a diameter to receive snugly liquid discharge and feeding tube 28.

Tube 28 is hollow as shown in FIG. 2 and is cut off normal to its axis at the end that is inserted in bushing 26. When pushed down into bushing 26, the end of discharge tube 28 engages the upper end of valve stem 21 at the dotted line position 21a. Continued movement of the tube moves the valve stem downwardly, that is inwardly toward valve structure 16 from the dotted line position 21a to the full line position shown in FIG. 2, in which latter position the valve is open and permits the discharge of liquid through the valve and the valve stem. The liquid issuing through the hollow valve stem 21 thus enters plant feeding tube 28. Tube 28 is held in this position by means of its frictional contact with bushing 26, the bushing in turn being held in a fixed position relative to the valve structure by means of protective sleeve 25. Bushing 26 provides a gas and liquid tight seal with tube 28 and the sleeve 25 to prevent loss of toxic materials at this point.

The outer end of plant feeding tube 28 is preferably cut off at an angle, to the tube axis as illustrated, to produce a pointed end adapted to be inserted into the stem of a plant as shown in FIG. 1. The tube introduces a liquid flowing through the tube directly into the plant stem at a position inwardly of the layer of bark or cortex layer, preferably in the vicinity of the xylem tissue. This tube can be set in the plant in various ways, as by inserting it in a previously drilled hole in the plant or, preferably, it may be easily set in the plant stem by means of a driving and setting tool as shown and described in my Patent 2,796,701, issued June 25, 1957, for "Tool for Placing Feeding Tubes in Plant Stems." The diagonal cut on the end of the feeding tube minimizes distortion of the tube while being driven as well as expedites flow of liquid because of better contact of the liquid with circulatory tissue of the plant.

Although there are circumstances under which bushing 26 exerts an adequate frictional grip on feeder tube 28 while still permitting relative movement of the tube, there may be circumstances requiring a further increase in the pressure of the bushing on the tube to substantially prevent movement of the tube. To do this I prefer to add to sleeve 25 a screw cap 30 which is screw threaded onto the outer end of the sleeve and which may be turned down to compress bushing 26 axially, thus pressing the bushing inwardly more tightly against feeding tube 28 insuring that the tube is held in position by the bushing and that the valve 16 is in turn held open by tube 28.

Prior to use, tube 28 is not inserted in the bushing and the container is provided with removable cap 31 which covers sleeve 25 and the valve stem against the entry of dirt and protects against damage from rough handling. Cap 31 is shown in dotted lines in FIG. 2 since it is removed from the top of the container when feeding tube 28 is to be inserted in bushing 26. It will be noted that protective sleeve 25 at all times protects valve 21 against being accidentally hit and opened, either by direct axial pressure on the valve in a direction to open the valve, or by pressure from the side which could have the same result. The only way that the valve is openable when sleeve 25 is in position is by depressing the valve by means of tube 28 or a closely similar member inserted deliberately through bushing 26. Likewise, immediately as soon as the pressure is taken off valve stem 21 by withdrawing tube 28 even a short distance, valve 16 is closed since it is normally biased to a closed position. This has the advantage that when the container 10 is detached from the feeding tube 28, valve 16 immediately and automatically closes and prevents the discharge of any toxic contents into the atmosphere, either in the form of a fume or a liquid. A safety factor is the fact that valve 16 is closed before tube 28 is disengaged from bushing 26 so that a full or partly full container still under internal pressure can be detached from a tube without danger of releasing toxic material.

When the feeding tube 28 is set into the trunk of a tree by means of the tool described in my patent referred to above, the frictional engagement between the tree trunk and the feeding tube is usually much greater than the frictional engagement between the tube and bushing 26 so that container 10 can simply be pulled away from the feeding tube, leaving the tube in place in the tree. It can then be replaced by another filled container, using the same feeding tube. For convenience of the user, the container may be packaged with a tube 28 as by attaching it to the exterior of the container by means of a piece of pressure sensitive tape, as indicated at 33 in FIG. 1.

An advantage of the present arrangement is that it overcomes some limitations in position inherent in gravity feeding devices. In such devices the reservoir must be above the feeding tube to have an hydraulic head causing flow into the tube. The pressurized container can operate with its axis horizontal and partly below the feeding tube as in FIG. 1 or below the feeding tube with its axis vertical as in FIG. 2, being supported in either case from the tree by tube 28. It is obvious that it can operate at a wide variety of intermediate positions since the pressure of the body of gas 14 is sufficient to drive the liquid up tube 18 and into the plant even when tubes 18 and 28 are vertical. For this purpose it is only necessary to provide a relatively low gas pressure above atmospheric, pressure in the range of 3 to 5 pounds per square inch above atmospheric usually being entirely adequate for this purpose. Of course higher pressure can be used if desired in order to obtain a greater lift of the liquid or more rapid feeding.

A further advantage of the present arrangement is the fact that the pressure behind the liquid drives it into the plant stem faster than when the liquid is fed by gravity alone from the usual gravity feed apparatus. For example the contents of a can under a low super-atmospheric pressure in the order of magnitude just mentioned, may empty in a matter of minutes as compared with several hours for a gravity type reservoir having a hydraulic head of only a few inches at most. This pressure is adequate to insure fluid flow even if an air bubble forms in the feeding tube. In gravity feeders, an air bubble may block flow as the pressure driving the liquid is not able to overcome the resistance to flow. No particular rate of feed can be predicted unless all conditions are known since the rate of absorption of the liquid into the plant stem depends upon the plant, the placement and setting of the feeder tube, air temperature, the rate of flow of sap, and various other factors.

A high degree of safety is afforded by using to control liquid discharge a self-closing valve that is accessible only to the feeding tube and which closes automatically when the tube is moved out of contact with the valve stem. Not only can a partly filled container be detached from a plant with safety, but the residue in an empty container is sealed inside. This eliminates problems of disposal of the empty containers.

FIG. 3 illustrates a variational form of the means for holding the feeding tube in place at the valve which differs from that shown in FIG. 2 in two respects. In the first place the construction has been simplified by omitting screw cap 30, reliance being placed solely on normal frictional contact between sleeve 26 and tube 28. The other difference is the introduction of adapter 35. In some cases the valve stem 36 is small in diameter and it is desired to use a feeder tube larger than the external diameter of the valve stem. Under these circumstances, adapter 35 is added. This is a cylindrical plug having an axially extending bore 37 of three different diameters. At one end is a section of a small diameter to receive the end of the valve stem 36, the end of the valve stem seating against a shoulder within the adapter. The opposite end of adapter 35 has a larger bore of a size to receive the end of tube 28 which also seats against a shoulder within the adapter. The intermediate section of bore 37 is smaller than either end section of the bore and communicates with both end sections. Thus pressure applied to tube 28 pushing it against the adapter causes the latter to transmit the movement to valve stem 36, opening the valve in body 16a. The liquid issuing past the valve flows through bore 37 in the adapter and then into feeding tube 28. The feeding tube is omitted from FIG. 3, showing the normal position of the parts during shipping or storage.

A further variation is shown in FIG. 4. Sleeve 25 in FIG. 2 is made of metal. By molding the sleeve 38 of plastic and of a diameter to engage directly the feeding tube, the sleeve can perform its usual protective functions and also the retention function of bushing 26. In the construction of FIG. 4, sleeve 38 alone supports the feeding tube in place and holds it in contact with valve stem 21 in position to keep the valve open. The plastic material has a coefficient of friction comparable with that of the rubber bushing in resisting axial movement of the feeding tube. A liquid and gas tight seal is also effected directly between the tube 28 and sleeve 38 without the need for a bushing as at 26. Sleeve 38 may be made integral with valve body 16 or a separate part, as most convenient.

From the foregoing it will be seen that various changes may be made in the illustrated embodiment without departing from the spirit and scope of my invention. For example, the container may be one without a dip tube and having a propellant charge of gas separated from the liquid by a cup-shaped free piston. The liquid body is there in direct contact with the inlet opening to valve 16; but the operation is essentially unchanged. A container of this type is disclosed in an article entitled "The Free-Piston Aerosol" in the August 1961 issue of the magazine "Modern Packaging" at page 129. Accordingly it is to be understood that the above description is considered to be illustrative of, rather than limitative upon, the invention as defined by the appended claims.

I claim:
1. Apparatus for injecting liquids directly into the stem or the like of a plant, comprising in combination:
   a container;
   a quantity of liquid within the container to be dispensed therefrom;
   a body of gas within the container under pressure greater than atmospheric tending to discharge said liquid from the container;

liquid discharge means for the container including valve means controlling flow of liquid through the discharge means, said valve means being biased to a closed position and movable to an open position in response to external pressure thereon;

a tube associated with the liquid discharge means in position to receive liquid discharged at said valve means from the container, said tube being insertable at one end into the stem of a plant;

and tube mounting means on the container slidably receiving the other end of the tube to engage and open the valve and removably holding the tube in engagement with the valve means to hold the valve means in open position and also in position to receive said discharged liquid.

2. Apparatus as in claim 1 in which the last mentioned means is a resilient bushing slidably receiving the tube and frictionally engaging the tube externally to hold the tube in position with respect to the container.

3. Apparatus as in claim 2 that also includes a protective sleeve mounted at one end on the container and surrounding the valve means, said sleeve being open at the other end and supporting the bushing in alinement with the valve.

4. Apparatus as in claim 2 that also includes means for compressing the bushing to increase the grip of the bushing on the tube.

5. Apparatus as in claim 1 in which the tube mounting means includes a protective guard rigidly mounted on the container and surrounding the valve means, said guard being open at one end only to admit the tube to engage the valve means.

6. Apparatus as in claim 1 in which the tube is a rigid member adapted to support the container on the stem of the plant by frictional engagement with the stem.

7. Apparatus for injecting a liquid directly into the stem or the like of a plant, comprising in combination:

a container holding a quantity of a liquid to be injected into a plant;

a body of gas within the container continuously under a pressure higher than atmospheric and tending continuously to discharge the liquid from the container;

liquid discharge means mounted on the container and including a valve member controlling flow of liquid through the discharge means and a spring urging the valve member to a normally closed position;

a feeder tube insertable at one end into a stem of a plant and adapted to receive and conduct said liquid thereto when discharged by said discharge means;

and tube mounting means attached to the container slidably receiving the other end of the tube to abut and move the valve member to an open position by axial movement of the tube relative to the mounting means and in opposition to said spring, the tube mounting means including means frictionally engaging the exterior surface of the tube to hold the tube in engagement with the valve member whereby pressure of the body of gas continuously forces said liquid out of the discharge tube until the liquid is all dispensed.

8. Apparatus as in claim 7 in which the tube mounting means includes stationary sleeve means surrounding the valve means and mounted at one end on the container and extending outwardly from the container beyond the valve means, said sleeve means being imperforate except for an opening to receive the feeder tube to hermetically enclose the junction of the feeder tube and the valve.

References Cited in the file of this patent

UNITED STATES PATENTS

| | | |
|---|---|---|
| 1,991,930 | Hope | Feb. 19, 1935 |
| 2,290,363 | Stirton | July 21, 1942 |
| 2,957,611 | Sagarin | Oct. 25, 1960 |
| 2,961,131 | Bradbury | Nov. 22, 1960 |
| 3,022,789 | Rallis | Feb. 27, 1962 |
| 3,083,882 | Schmid | Apr. 2, 1963 |

FOREIGN PATENTS

| | | |
|---|---|---|
| 1,044,498 | France | June 17, 1953 |
| 581,164 | Italy | Aug. 21, 1958 |

OTHER REFERENCES

Southwick, "Pressure Injection of Iron Sulfate Into Citrus Trees," published August 1945 in Proceedings of the American Society for Horticultural Science, vol. 46, pages 27 through 31.